United States Patent [19]

Pellaton

[11] 4,147,081
[45] Apr. 3, 1979

[54] PASTA NOODLE PACKAGING APPARATUS AND METHOD

[76] Inventor: Roy C. Pellaton, 2308 Virginia La., Stockton, Calif. 95204

[21] Appl. No.: 827,736

[22] Filed: Aug. 25, 1977

[51] Int. Cl.² .............................................. B26D 7/06
[52] U.S. Cl. ........................................ 83/407; 53/516; 83/107; 83/422; 83/435.2; 99/356; 198/445; 198/473
[58] Field of Search .............. 83/107, 407, 422, 425.2, 83/435.2; 198/445, 473, 477, 678; 99/443 C, 355, 356

[56] References Cited

U.S. PATENT DOCUMENTS

| 813,946 | 2/1906 | Caldwell et al. | 83/407 |
| 1,948,905 | 2/1934 | Duckworth | 83/407 |
| 2,893,401 | 6/1959 | Lauder | 83/422 |

Primary Examiner—Travis S. McGehee
Attorney, Agent, or Firm—Naylor, Neal & Uilkema

[57] ABSTRACT

A method and apparatus for removing lasagne noodles from the stripper of a high production pasta oven and packaging the noodles in a continuous processing line. The output of the stripper is split and directed along separate paths whereby the rate at which product is discharged to each path is reduced in half, as compared to conventional strippers. Conveyors transfer the respective split components of the stripper output away from the stripper and through successive accumulator, inspection and sawing stations. After departing from the sawing stations, the noodles are shingled into sub-components of a predetermined number of noodles and these sub-components are then displaced into containers for final packaging.

15 Claims, 15 Drawing Figures

PASTA NOODLE PACKAGING APPARATUS AND METHOD

BACKGROUND OF THE INVENTION

The present invention relates to an improved apparatus and method for conveying lasagne noodles from the stripper of a high production pasta oven in such a manner that the noodles may be continuously processed through a packaging line, without interruption.

In its more specific aspects, the invention is concerned with a packaging line wherein the output of the stripper is divided in half in order to reduce the speed at which the product is delivered through the line.

The high production oven and the associated stripper with which the apparatus and method of the present invention is used may vary in design. Such ovens and strippers are well known in the prior art and the invention is not intended to be limited to use with any particular oven or stripper. Typically, the ovens carry noodles draped over long sticks. In one oven with which the present invention is used, each stick carries 36 noodles, 2 inches wide and 20 inches long, on a side. The sticks carry the noodles so as to be spaced about one-half inch from one another and the oven discharges the sticks to the stripper at a rate of nine sticks per minute. Thus, the stripper discharges noodles at a rate of 324 pieces per minute, each of which pieces comprises a folded over element having two 20-inch long sides. If the noodles produced at this rate are reduced to 10-inch long sections, the total of 1,296 pieces per minute are produced.

The high production rate of the prior art ovens and strippers has necessitated that packaging operations be discontinuous in the sense that it has been necessary to physically remove noodles from the production line during stripper operation in order that these noodles might be stored and then later processed for packaging. Such discontinuous operation has been necessary because of the physical limitations on the rate at which noodles may be cut to size, grouped in predetermined counts for packaging and, ultimately, packaged.

SUMMARY OF THE INVENTION

In its broadest aspects, the present invention is concerned with a method and apparatus for slowing down the rate at which noodles discharged from a high production oven and associated stripper must be handled and for providing for the continuous handling of such noodles, without interruption. The principal feature enabling the slowed-down handling operation is the provision of a splitter within the stripper to divide the stripper output in half and direct the respective halves to separate processing paths. Thus splitting the output enables the product speed within the processing line to be reduced in half, as compared to conventional processing lines wherein the entire stripper output is directed through a single path.

The continuous processing provided by the present invention is also facilitated by the provision of accumulator conveyors within the processing line to further slow down the rate of movement of noodles; slightly higher speed inspection conveyors within the processing line to receive the noodles from the accumulator conveyors and, at least partially, spread the noodles for inspection; and, sizing saws disposed to receive the output from the inspection conveyors, saw the noodles to length, and direct the noodles for continued processing within the line. In the preferred embodiment, the sizing saws perform the first noodle cutting function within the line. Thus, the noodles remain in the generally U-shaped configuration which they assumed when draped over the rods in the oven until such time as they reach the sizing saws. Maintaining this configuration gives the line more tolerance for non-uniform or crooked noodles.

It is, accordingly, a principal object of the present invention to provide a lasagne noodle packaging line wherein the entire output of a high production oven and associated stripper may be continually processed, without interruption.

Another and more specific object of the invention is to provide such a line wherein the rate at which noodles must be handled is reduced in half by splitting the output of the stripper.

Still another object of the invention is to provide a packaging line with accumulator and inspection conveyor sections which first slow down the rate of progress of the noodles and then spread the noodles for inspection.

A further object of the invention is to provide an improved saw for incorporation into a noodle processing line, which saw is adapted to be incorporated into the line downstream of the stripper.

Still another and more general object of the invention is to provide a packaging line for conveying lasagne noodles from the stripper of a high production oven in an orderly manner with the noodles so spread that inspection and automated handling is facilitated.

The foregoing and other objects will become more apparent from the accompanying drawings and following detailed description.

DESCRIPTION OF THE PREFERRED EMBODIMENT

Figures 1, 2, 3:
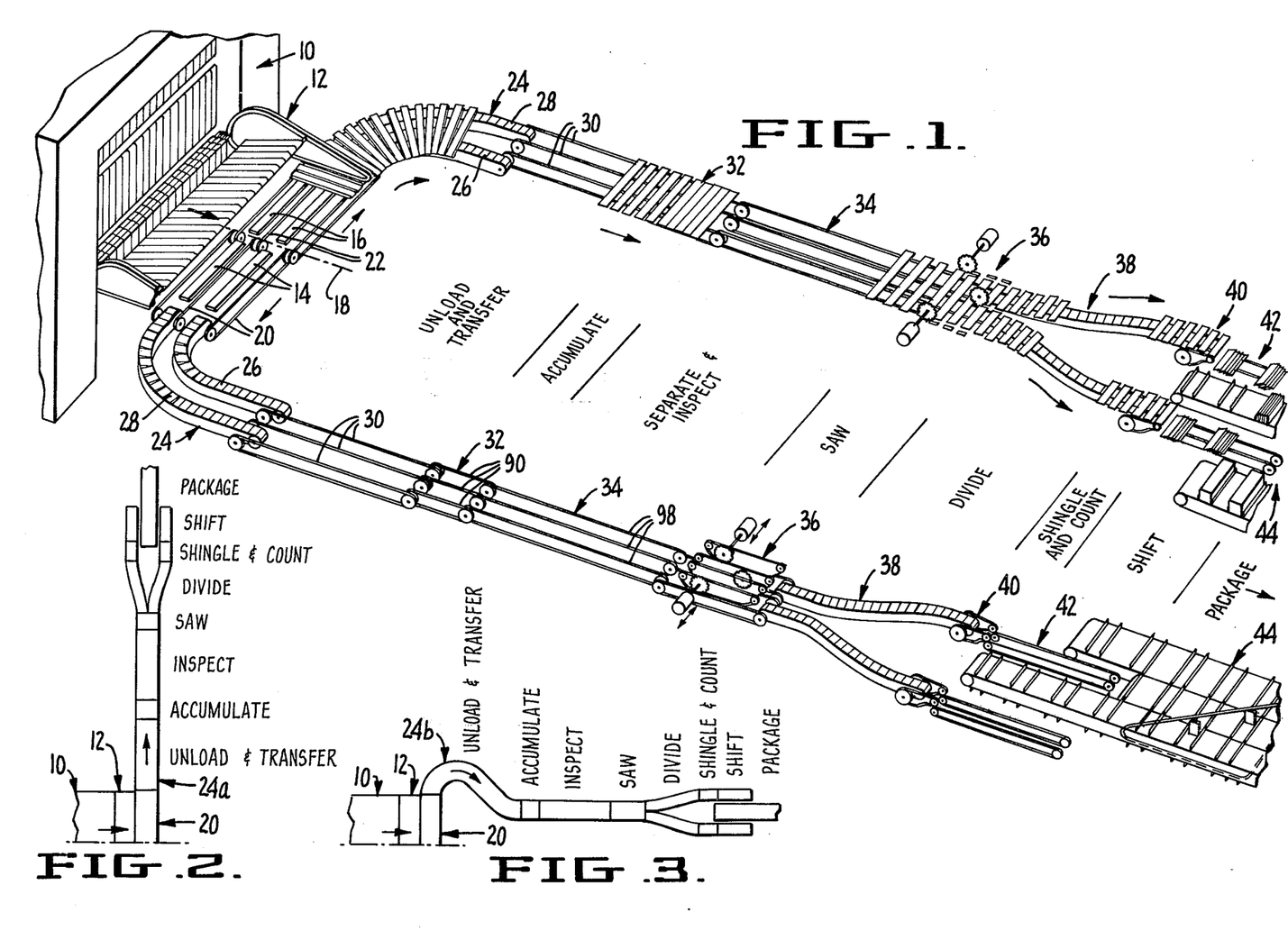
FIG. 1 is a perspective view diagrammatically showing the line of the present invention at the discharge end of a high production noodle oven.
FIG. 2 is a plan view of a segment of a line, altered from that shown in FIG. 1 in that the output from the stripper is directed in a straight line.
FIG. 3 is a plan view of a segment of a line, altered from that illustrated in FIG. 1, in that the output from the stripper is directed through a generally S-shaped curve.

Referring now to FIG. 1, the high production oven therein is designated in its entirety by the numeral 10 and is shown discharging to a stripper 12. The stripper incorporates receiving platforms 14 and 16 to either side of the longitudinal center line thereof, designated 18, and stripper conveyors 20 and 22 are associated with the respective platforms, 14 and 16, to discharge noodles to either side of the stripper.

The stripper and its associated platforms and conveyors form the first segment of the processing line forming the subject of the present invention. The line, as can be seen from FIG. 1, is divided into two substantially identical sections, each of which receives one-half of the output of the stripper. For purposes of simplification, corresponding elements of the two sections will be identified by like numerals and the following detailed description will only deal with one of the sections.

The stripper conveyors discharge onto transfer conveyors 24 which, in the FIG. 1 embodiment, include curved plate conveyor segments 26 and 28 and straight belt conveyor segments 30. The transfer conveyors are driven at substantially the same speed as the stripper conveyors and, in the FIG. 1 embodiment, the inner and outer plate conveyors 26 and 28, respectively, are so driven as to have substantially the same angular velocity in order that noodles carried thereby will remain generally normal to the direction of travel of the conveyors. The belt conveyor segments 30 overlap with the plate conveyors 26 and 28 in order that the transfer to the belt conveyor segments may be continuous.

From the transfer conveyors 24, the noodles are directed, in succession, to: accumulator conveyors 32; inspection conveyors 34; saw stations 36; dividing conveyors 38; shingling and counting stations 40; shifting stations 42; and, packaging stations 44. In one example, employing an oven and stripper for the capacity described in the foregoing Background of the Invention, the conveyors 24 move at 82 feet/minute, the conveyors 32 move at 27 feet/minute; the conveyors 34 move at 40 feet/minute; and the conveyors within the saw stations move at 45 feet/minute. At these speeds, the noodles discharge from the stripper in groups at about 3 second intervals, with successive groups received on the respective conveyors 24 being spaced by about 54 inches. It should be understood, however, that these speeds can be varied to meet production demans, up to the limit of the system. For example, with the system shown, the respective speeds could be varied by about plus or minus 25 percent. This would mean that the transfer conveyors 24 could be driven at a rate of from 60 to 105 feet per minute, the accumulator conveyors 32 could be driven at a speed from 20 to 35 feet per minute, the separation and inspection conveyors 34 could be driven at a speed from 30 to 50 feet per minute, and the saw station conveyors could be driven at a speed of from 33 to 57 feet per minute. In the preferred embodiment, it has been found that the ratio of transfer conveyor speed to accumulator conveyor speed should be about 3 to 1 and that the ratio of separation and inspection conveyor speed to accumulator conveyor speed should be about 1.5 to 1. These ratios result in accumulation of the noodles on the accumulator conveyors to close up the space between successive groups of noodles and adjacent noodles within the groups, and at least partial spreading of the noodles on the inspection conveyors. Thus, the accumulator conveyors and the inspection conveyors function to further slow down the rate at which noodles are conveyed. As a result of closing up of the space between adjacent noodles on the accumulator conveyor, adjacent noodles which may be askew are moved into parallel relationship to one another. The speed at which the inspection conveyors are driven may be varied to control the degree of spreading of the noodles, depending upon noodle quality. Where quality is good, the noodles on the inspection conveyor may be maintained in substantially edge to edge contact to minimize the possibility that adjacent noodles will move out of parallel relationship to one another. To maintain the latter condition, the inspection conveyor may be driven at the same speed as the accumulator conveyor.

FIG. 2 illustrates a modified transfer conveyor arrangement which might be used as an alternate to one or both of the transfer conveyors illustrated in FIG. 1. The FIG. 2 transfer conveyor, designated 24a, differs from that shown in FIG. 1 in that the transfer conveyor unloads from the stripper conveyor in a straight line, thus avoiding the necessity of curved plate conveyor segments, such as the segments 26 and 28.

FIG. 3 illustrates another modified transfer conveyor, designated 24b, which might be used as an alternate to the transfer conveyors of FIG. 1. The transfer conveyor of FIG. 3 differs from that of FIG. 1 only in that it has a double curve and resultant semi-S shape. Although not illustrated in detail, it should be understood that the double curve would be provided by curved plate conveyor segments similar to the segments 26 and 28.

The choice of whether the FIGS. 1, 2, or 3 transfer conveyors, or a combination of these conveyors, would be used, would depend upon the layout of the plant within which the line is installed. The eifferent conveyor arrangements shown in these figures are not intended to alter the basic mode of operation of the line. They are simply provided in order that the line might be directed to accommodate the different plant layouts.

Figure 4:
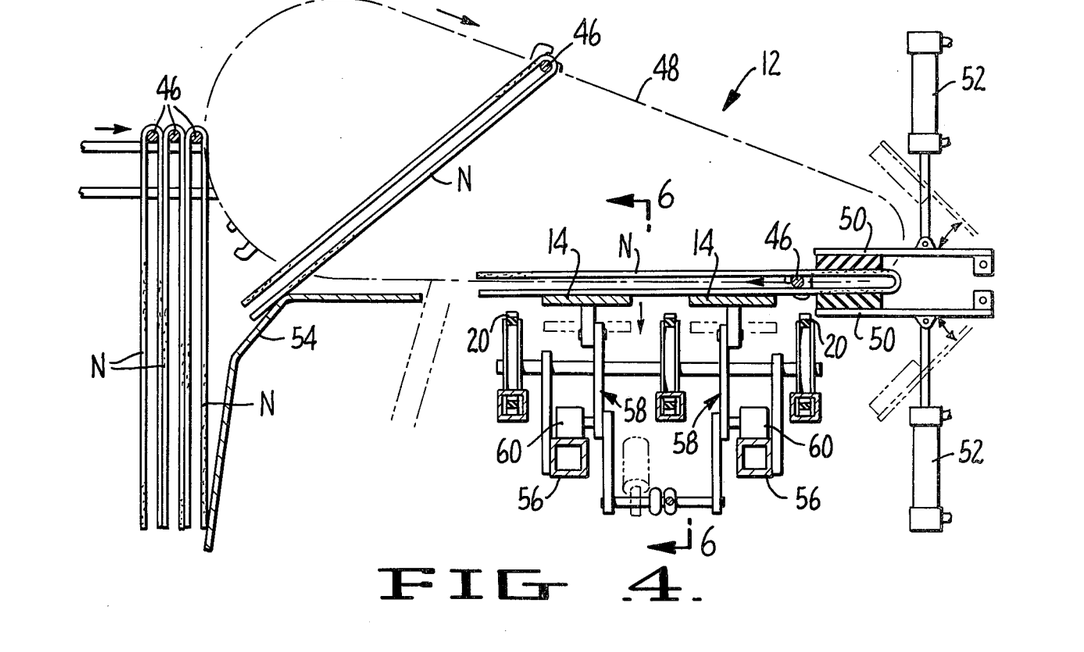
FIG. 4 is a cross-sectional elevational view, taken through the stripper at the discharge end of the oven and illustrating the platform and conveyors employed to split the output of the stripper.
Figure 5:
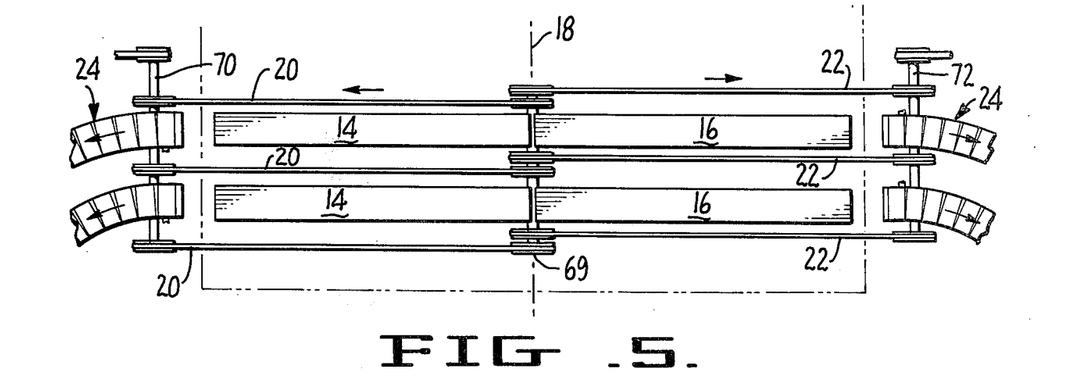
FIG. 5 is a plan view of the stripper.
Figure 6:
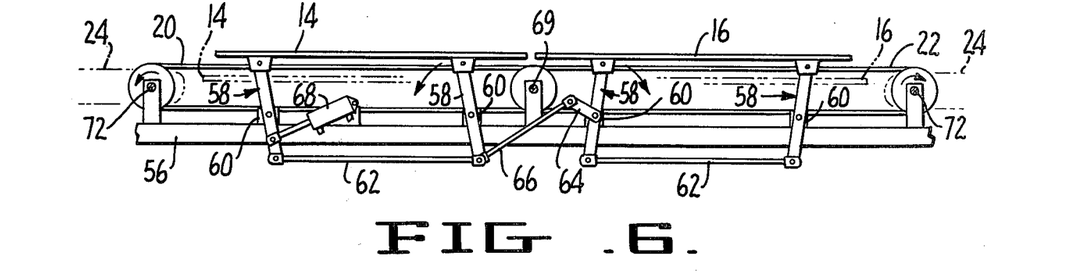
FIG. 6 is a cross-sectional elevational view of the stripper, taken on the plane designated by the Line 6—6 of FIG. 4.

FIGS. 4, 5 and 6 illustrate a stripper in combination with the receiving platforms and stripper conveyors of the present invention. The stripper is of conventional construction and forms no part of the invention. It is anticipated that other conventional strippers might be employed. As illustrated, the stripper is shown at the discharge end of the oven 10 and a plurality of noodle carrying rods or sticks 46 are shown accumulated for transfer by the stripper. In operation, the stripper successively carries the rods 46 through the path indicated by the dashed line 48. When the rods and the noodles carried thereby reach the righthand extremity, as viewed in FIG. 4, jaws 50 are actuated to engage the noodles and, with continued movement of the rods 46, the noodles are stripped therefrom. The jaws are selectively actuated by pneumatic cylinders 52. The solid and phantom lines shown in FIG. 4 illustrate the extemities of movement of the jaws. FIG. 4 also shows a guide shelf 54 which forms part of the conventional stripper structure.

The receiving platforms 14 are mounted beneath the stripper 12 on parallel linkages for movement between the elevated and retracted positions illustrated, respectively, by the solid and phantom line representations in FIG. 6. The linkages are supported on a framework 56 and comprise: upright links 58 journaled medially the ends thereof to the framework 56 by journals 60; and lower links 62 pivotally secured to the lower ends of the upright links. The upper ends of the upright links 58 are pivotally secured to the plates 14. The centrally disposed upright links to either side of the center line of the stripper are secured together by an arm 64 fixed for rotation with one of the links and a link 66 pivotally secured between said arm and the other of the centrally disposed upright links. A double-acting pneumatic cylinder 68 is coupled between the framework 56 and the upright links to one side of the stripper (i.e., the left side as viewed in FIG. 6). Expansion and retraction of the cylinder 68 functions, respectively, to lift and lower the plates 14. During the lowering operation, the plates to either side of the center line 18 spread and, thus, separate the noodles supported thereon. When in the lowered position, the plates are beneath the level of the upper reaches of the stripper conveyors 20 and 22 and, thus, any noodles supported on the plates when the plates move to the lower position are deposited on said reaches.

Conveyors 20 and 22 each comprise closed loop belts supported on sheaves mounted on the framework 56. The sheaves for the inner ends of the belts are rotatably supported on a common shaft 69 and, thus, said inner ends overlap. The sheaves for the outer ends of the belts are keyed to and supported on shafts 70 and 72 driven for rotation in the directions indicated by the curved arrow lines in FIG. 6.

In operation, the stripper conveyors 20 and 22 are continually driven and the platforms 14 are intermittently moved up and down in synchronization with the stripper. The synchronized operation of the platforms is such that the platforms are in the elevated noodle receiving position during the process wherein the strippers are depositing the noodles and are moved to the lower position at the end of this process. Upon moving to the lower position, the platforms move the noodles outwardly and downwardly into engagement with the stripper conveyors. Once on the stripper conveyors, the conveyors discharge the noodles out of the stripper and onto the transfer conveyors 24. From FIG. 5, it will be seen that the transfer conveyors overlap with the stripper conveyors in order that there is a smooth transition of the noodles from the stripper conveyors to the transfer conveyors.

In the drawings, the noodles are designated by the letter N. From FIG. 4, it will be seen that each noodle initially comprises a noodle blank draped over the rod 46 therefor. Each blank has two sides connected together by a loop which initially extends around the support rod. In the preferred embodiment, the blank remains in a condition where the sides thereof are secured together by the loop until such time as the blanks are sawed within the saw stations 36.

Figure 7:
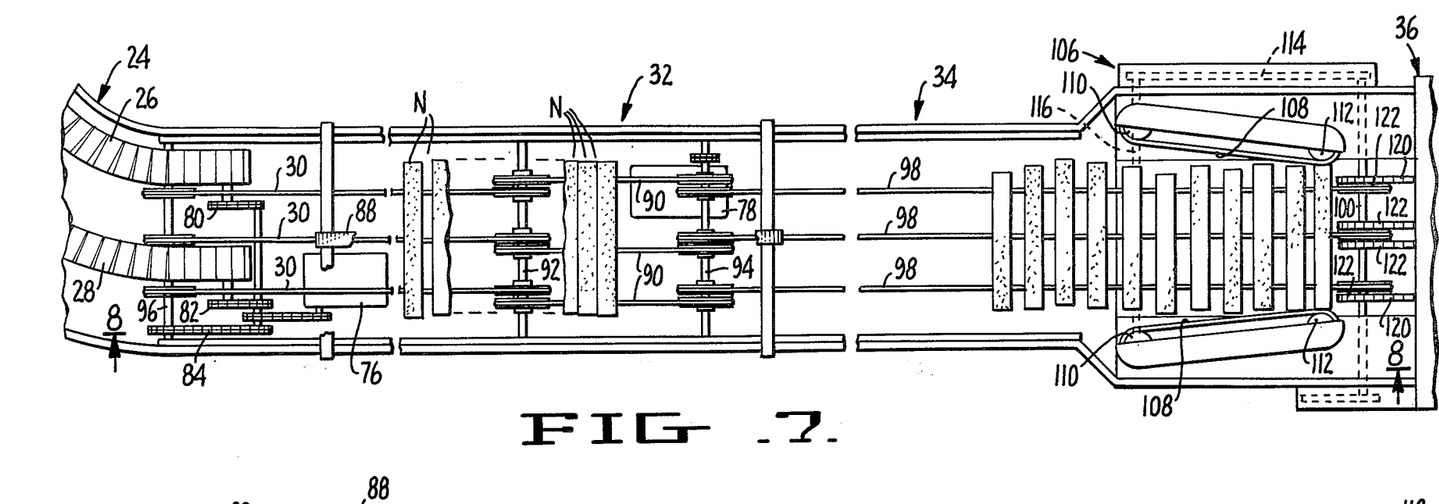
FIG. 7 is a plan view of the accumulator and inspection sections of one side of the line.
Figures 8, 9:
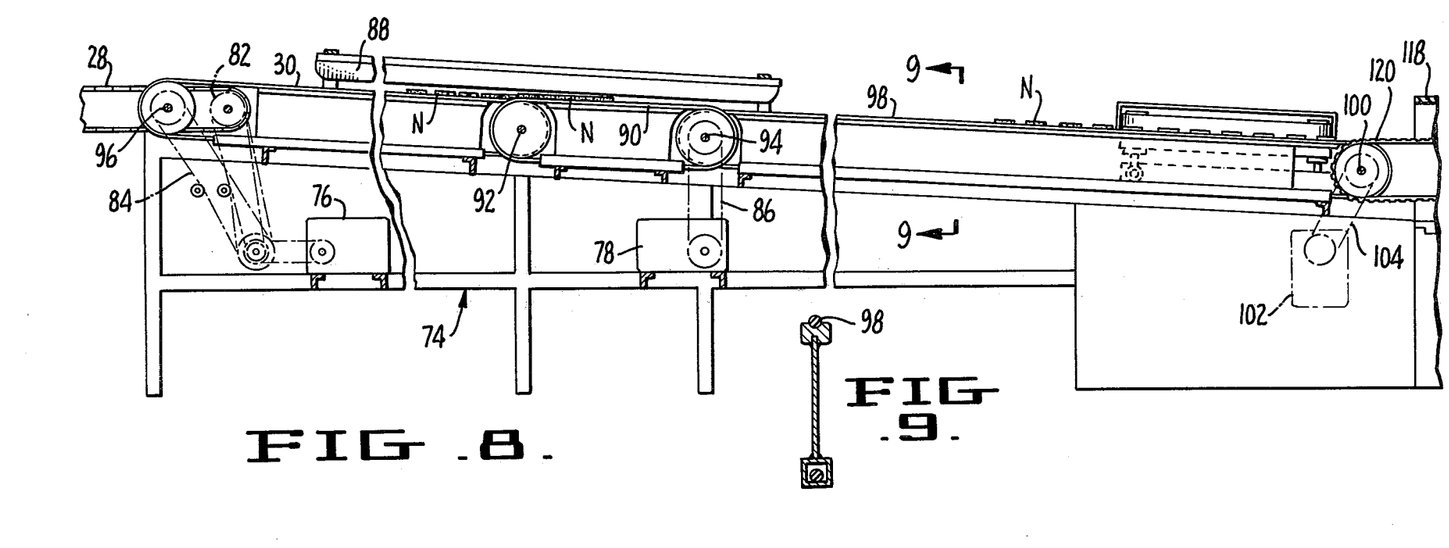
FIG. 8 is a cross-sectional elevational view of the accumulator and inspection sections, taken on the plane designated by Line 8—8 of FIG. 7.
FIG. 9 is a cross-sectional view taken on the plane designated by Line 9—9 of FIG. 8.

FIGS. 7 and 8 illustrate one side of the line from the discharge end of the transfer conveyor 24 to the inlet end of the saw station 36. As may be seen from FIG. 8, the conveyors over this length are supported on a framework 74. This framework mounts drive motors 76 and 78 beneath the conveyors. The motor 76 drives the plate conveyor segments 26 and 28 and the belt conveyor segments 30 of the transfer conveyor 24 and the motor 78 drives the accumulator conveyor 32. Chain drives 80 and 82 are provided to drive the plate conveyors 26 and 28, respectively, in order that said conveyors move at the same angular velocity. A chain drive 84 drives the belt conveyor 30. The accumulator conveyor 32 is driven from the motor 78 through means of a chain drive 86.

FIGS. 7 and 8 also show a floating bar 88 supported above the trailing end of the belts 30 and the entire length of the accumulator conveyor 32. This bar is provided to slidably engage the upper surfaces of the noodles supported on the conveyors and it is free to float up and down. Its purpose is to engage the noodles so as to prevent overlapping of the noodles in case the noodles are badly distorted.

The belts of the accumulator conveyor are designated by the numerals 90 and are supported on shafts 92 and 94 through means of sheaves. The sheaves on the shaft 92 are free to rotate relative thereto and this shaft also carries sheaves for the belts 30. The ends of the belts 30 opposite those supported on the shaft 92 are driven by sheaves keyed to a shaft 96 driven by the chain drive 84. The sheaves for the belts 90 supported on the shaft 94 are keyed to the shaft in order that said sheaves may be driven by the chain drive 86. The shaft 94 also rotatably supports sheaves for the belts, designated 98, of the separation and inspection conveyors 34. The ends of the belts 98 opposite those supported on the shaft 94 are supported on a shaft 100 through means of sheaves keyed to the shaft. The shaft 100 is driven by a motor 102 through means of chain drive 104. FIGS. 7 and 8 also depict the manner in which the noodles spread as they are transferred from the accumulator conveyor 32 to the inspection conveyor 34. This results from the increased speed at which the inspection conveyor is driven, as compared to that of the accumulator conveyor.

The centering mechanism used to center the noodles as they are moved from the inspection conveyor to the saw station may be seen at the righthand ends of FIGS. 7 and 8. This mechanism is designated in its entirety by the numeral 106 and comprises: vertically disposed closed loop belts 108; sheaves 110 and 112 supporting said belts so as to define a converging mouth with the open end of the mouth having a width appreciably greater than the length of the noodles and the necked-down inner end of the mouth having a width only slightly greater than the width of the noodles; and, a belt 114 driven by the shaft 100 to, in turn, drive the sheaves 110 through a shaft 116. The latter drive arrangement drives the belts 108 at the same speed as the belts 98.

Figure 10:
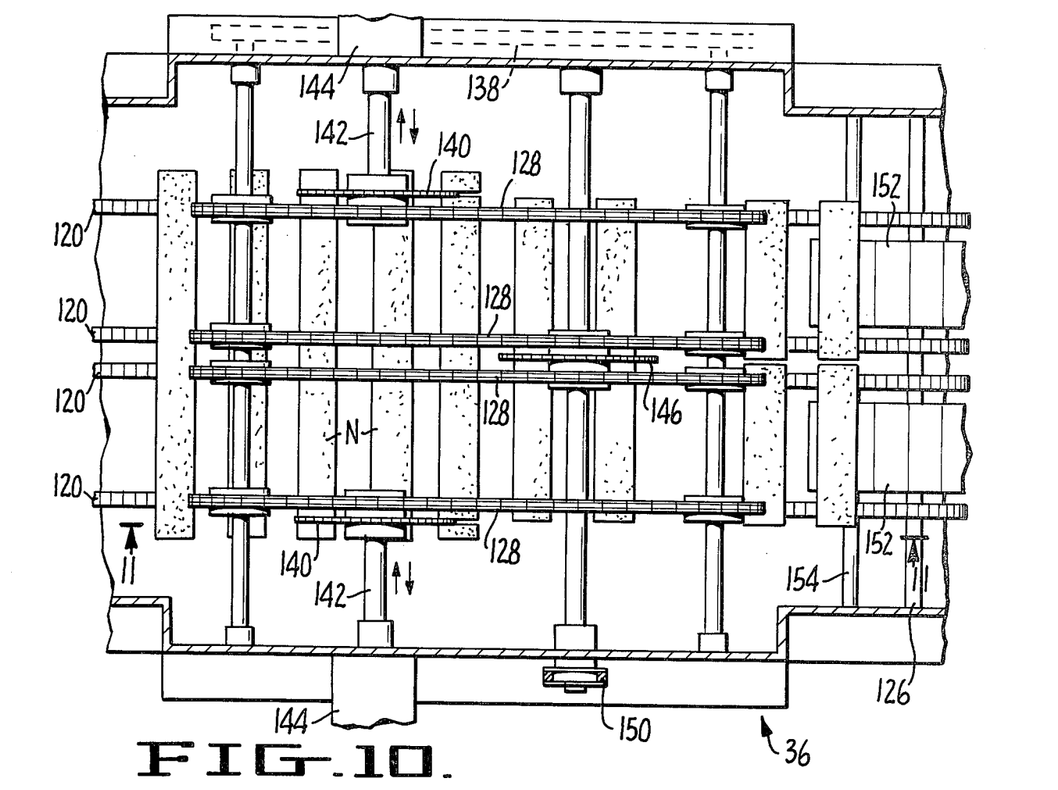
FIG. 10 is a cross-sectional plan view of the saw employed in the line of the present invention.
Figure 11:
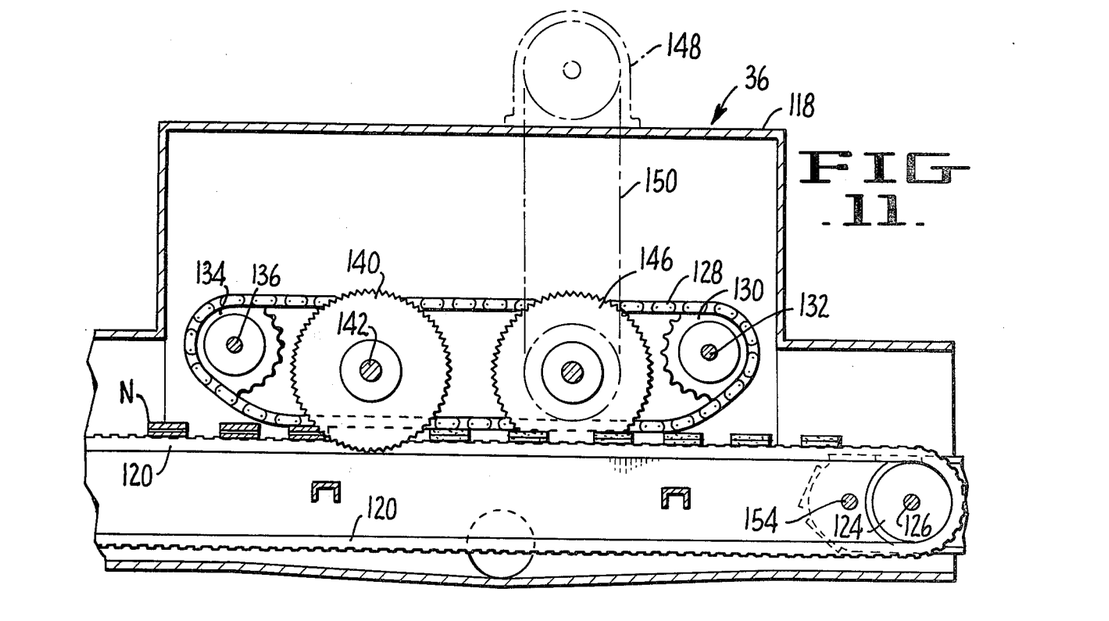
FIG. 11 is a cross-sectional view taken on the plane designated by Line 11—11 of FIG. 10.

FIGS. 10 and 11 illustrate, in detail, the saw station 36. The station comprises: a tunnel box 118; four toothed conveyor belts 120 extending longitudinally through the tunnel box, said belts being supported at one end on sheaves 122 (see FIG. 7) keyed to the shaft 100 and at the other end by sheaves 124 supported on shaft 126; four weighting chains 128 extending above the outermost of the belts 120 in longitudinal alignment therewith, said chains being supported at one end by sprockets 130 keyed to a support shaft 132 and at the other end by sprockets 134 keyed to a support shaft 136; a drive chain 138 for driving the shafts 132 and 136 in unison so that the lower reaches of the chains 128 move at the same rate as the upper reaches of the belts 120; a pair of circular end cut saws 140 mounted on shafts 142 driven by electric motors 144, said motors being mounted for selective adjustment toward and away from each other as indicated by the arrow lines in FIG. 10; a center cut circular saw 146 mounted downstream of the saws 140; and, a drive motor 148 coupled in driving engagement with the saw 146 by a belt drive 150.

In operation, noodle blanks discharging from the inspection conveyor 34 are centered by the mechanism 106 and drawn into the saw station by the toothed conveyor belts 120. The end cut saws 140 function to cut the ends off of the noodle blanks, thus removing the loops connecting the opposite sides of the blanks and forming two noodles from each blank. After being thus cut, the noodles continue to be drawn through the station by the toothed belts 120 and, upon being drawn beneath the center cut saw 146, the blanks are cut in half. During the entire cutting operation, the noodles are held down by the lower reaches of the weighting belts 128. These reaches are of sufficient length that the belts sag into engagement with the noodles under the influence of gravity. Ultimately, the noodles discharge from the downstream end of the tunnel box 118 (i.e., the righthand end as viewed in FIGS. 10 and 11).

Adjustment of the end cut saws toward and away from each other provides means whereby the lengths of the noodles may be adjusted to control the final packaged product weight. Although a center cut saw is incorporated into the preferred embodiment of the saw station, it should be understood that where long noodles are desired, this saw could be omitted.

Figure 12:
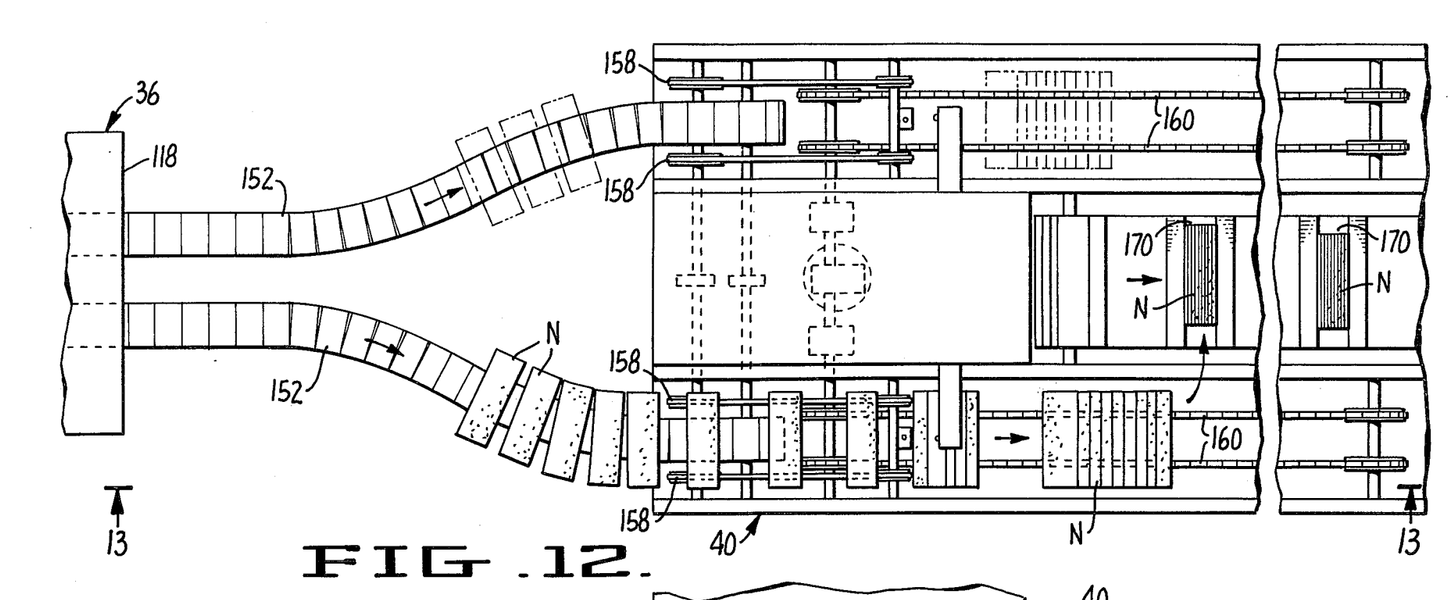
FIG. 12 is a plan view of the shingler and counting mechanism employed in the line.
Figure 13:
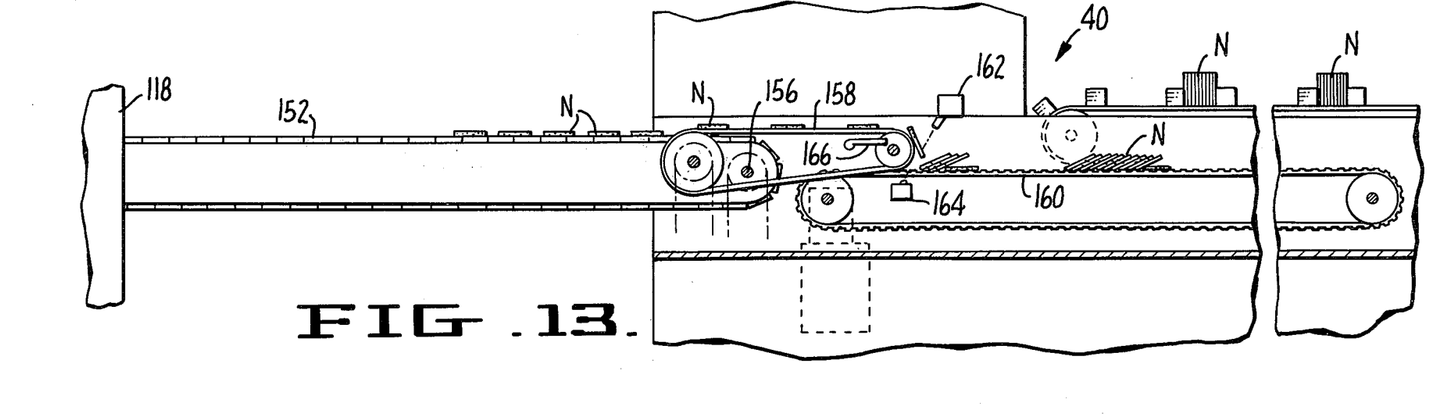
FIG. 13 is a cross-sectional elevational view taken on the plane designated by Line 13—13 of FIG. 12.

FIGS. 12 and 13 illustrate the apparatus for conveying the noodle sections from the saw station, and shingling the noodle sections into groups of a predetermined count. The conveyor mechanism for conveying the sections from the saw station comprises a pair of closed loop plate conveyors 152 extending at one end into the saw station 136 and at the other end into the shingler mechanism. The ends of the plate conveyors within the station 36 are supported on sprockets mounted on the shaft 154. The ends of the plate belts within the shingler and counting mechanism are supported on sprockets mounted on a shaft 156. In the preferred embodiment, the plate conveyors are driven to move at the same speed as the toothed conveyor belt 120 within the saw station.

The shingling and counting station 40 is comprised of two mechanisms corresponding substantially to that illustrated and described in my copending United States Patent Application Ser. No. 794,439, filed May 6, 1977. One such mechanism is disposed at the discharge end of each of the plate conveyors 152. The mechanisms each comprise: upstream conveyor belts 158; downstream conveyor belts 160 disposed beneath the discharge ends of the upstream belts 158 so as to receive noodle segments therefrom; a light source 162 and associated photo sensor 164 disposed to detect noodle segments which drop from the upstream belt 158 to the downstream belt 160; an air nozzle 166 disposed to direct a jet of air against the noodle segments as they drop from the upstream belt to the downstream belt so as to flip said segments over; and, counting mechanism associated with the photo sensor 164 and a drive for the downstream belt 160 so as to move said belt intermittently whereby noodle segments received on said belt are grouped in groups of a predetermined package count. The detailed structure and mode of operation of the shingling and counting station will be better appreciated when viewed in light of my copending Application Ser. No. 794,439.

The shifting stations 42 are disposed at, and incorporated into, the downstream ends of the shingling and counting stations 40. Each shifting station comprises the downstream ends of the conveyors 160 and a packaging bundle conveyor 168 disposed intermediate said downstream ends. In operation, operators stand to the outside of the downstream conveyors 160 and physically lift the precounted groups of noodles on the conveyors 160 from these conveyors and place them into pockets 170 defined by spaced upright barrier members carried by the conveyor 168. The curved arrow line in FIG. 12 leading from the lower conveyor 160 to the package bundle conveyor 168 is intended to depict the path through which a group of noodles moves as it is physically lifted from the conveyor 160 to the conveyor 168.

The arrow line on the conveyor 168 in FIG. 12 depicts the direction of travel of the upper reach of the conveyor and the pockets carried thereby.

Figure 14:
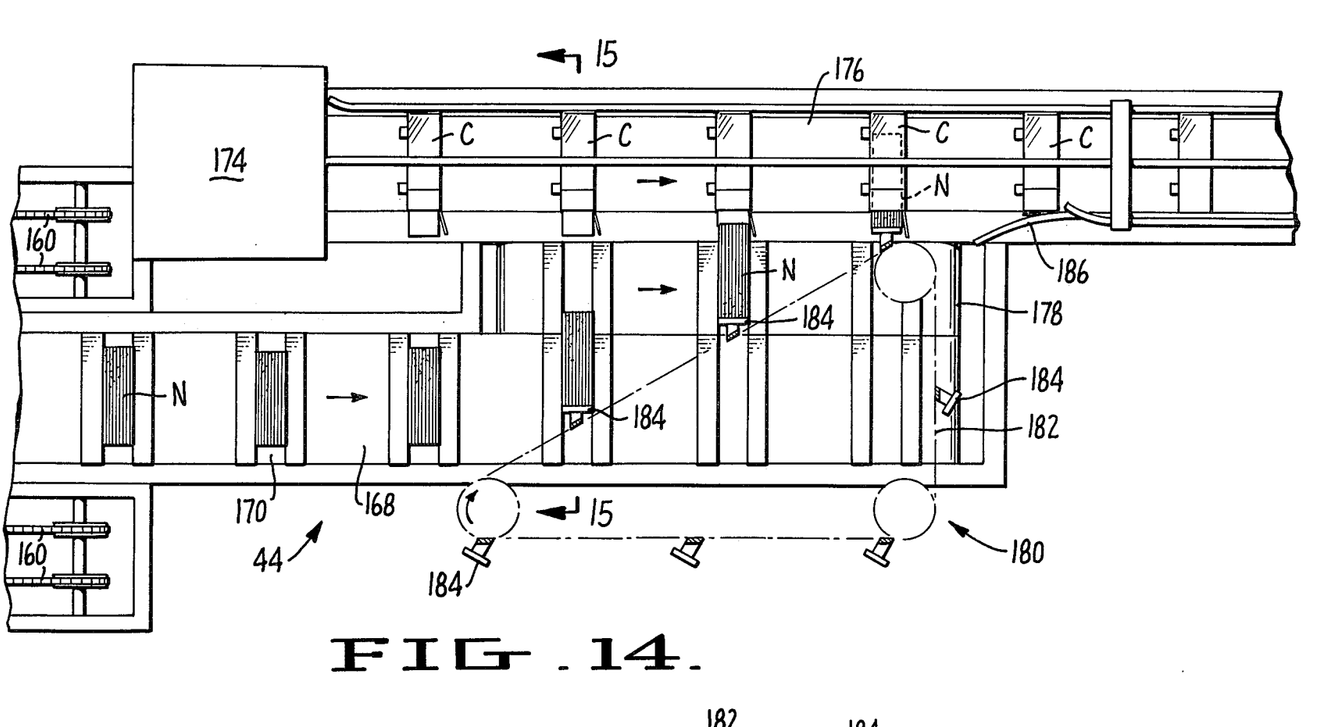
FIG. 14 is a plan view of the packaging apparatus incorporated into the line of the present invention; and, FIG. 15 is a cross-sectional view taken on the plane designated by Line 15—15 of FIG. 14.
Figure 15:
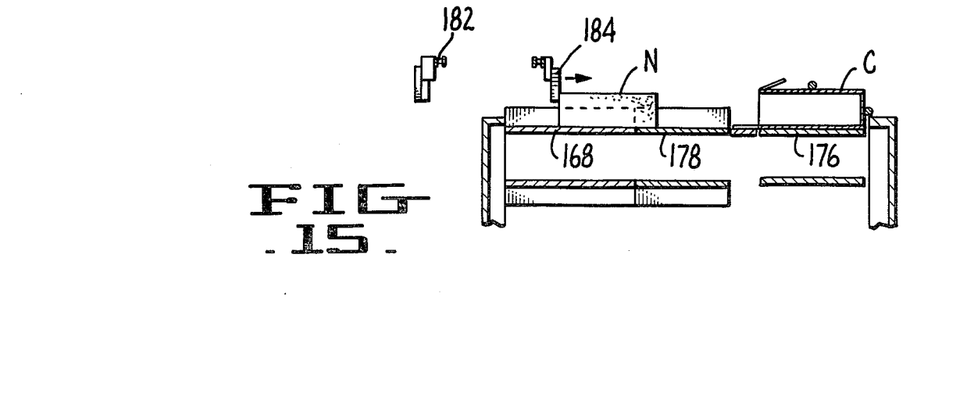

FIG. 14 illustrates the end of the packaging bundle conveyor 168 downstream from that portion of the conveyor shown in FIG. 12 and further shows the packaging station 44 associated with the conveyor. The packaging station comprises: a box machine 174 of the type adapted to contain a magazine of folded carton blanks and direct these blanks into open condition; a carton conveyor 176 adapted to receive cartons, designated C, from the box machine in open-ended condition aligned with the pockets of the package bundle conveyor 168, said carton conveyor being driven to move in alignment with, and at the same rate as, the package bundle conveyor; an intermediate guide conveyor 178 disposed between the package bundle conveyor 168 and the carton conveyor 176 and moving in unison with said conveyors, said guide conveyor having guide pockets disposed at one end in alignment with the pockets of the package bundle conveyor and at the other end in alignment with the cartons C carried by the carton conveyor 176; a pusher mechanism 180 having a closed loop chain 182 carrying pushers 184 disposed for alignment with and movement through the pockets 170 of the package bundle conveyor and the aligned pockets 180 of the intermediate guide conveyor to push noodles within the pockets 170 from the pockets and into the cartons C, said chain 182 being driven in unison with the package bundle conveyor 168 and the intermediate guide conveyor 178 by a drive mechanism (not illustrated); and, a flap closing and sealing mechanism 186 to close the cartons C after the noodles have been injected thereinto by the pushers 184.

The packaging station 44 has been shown in relatively diagrammatic form because it is intended primarily to illustrate that the present invention provides a continuous packaging line extending from the stripper to the boxing mechanism. The details of the packaging station do not, by themselves, form part of the present invention.

Conclusion

From the foregoing detailed description, it is believed apparent that the present invention enables the attainment of the objects initially set forth herein. In particular, the invention provides a continuous packaging line for elongate pasta noodles wherein the output of the stripper is split and the noodles are handled in a continuous and orderly manner facilitating their continuous handling by automated apparatus. It should be understood, however, that the invention is not intended to be limited to the specifics of the embodiment herein illustrated and described, but rather is defined by the accompanying claims.

What is claimed is:

1. In combination with a stripper for stripping elongate noodles from a high production pasta oven, the improvement comprising: a conveyor disposed at the stripper to receive noodles therefrom, said conveyor being split into generally oppositely directed sections whereby noodles received thereon are divided and directed in generally opposite directions; platform means operatively associated with said stripper and conveyor to initially receive noodle from the stripper during stripping, said platform means being mounted for movement between a first position wherein noodles received thereon are held out of engagement with the conveyor and a second position wherein noodles are transferred therefrom to the conveyor; and, means to selectively move the platform means between the first and second positions.

2. In a combination according to claim 1, the improvment wherein: the conveyor comprises a first belt conveyor driven to move in one direction and a second belt conveyor driven to move in a generally opposite direction, said first and second belt conveyors having inner ends disposed in adjacent relationship to one another; and, the platform means comprises first and second platforms mounted, respectively, beneath said first and second belt conveyors, said platforms being mounted so as to be in closely adjacent end-to-end relationship elevated relative to the conveyor belts when in the first position and to spread end-to-end relative to one another when moving from the first position to the second position.

3. In a combination according to claim 2, the improvment wherein the inner ends of the belt conveyors are supported on a common shaft whereby said conveyors overlap, while being driven in generally opposite directions.

4. In combination with a stripper for stripping elongate noodles from a high production pasta oven, the improvement comprising: a receiving platform disposed at the stripper to collect noodles therefrom; a stripper conveyor operatively associated with the receiving platform to receive noodles from the platform, said conveyor being split into a first section disposed to direct noodles received by said section to one side of the stripper and a second section disposed to direct noodles received by said section to a side of the stripper generally opposite said one side; and first and second transfer conveyors disposed in receiving relationship, respectively, to the first and second sections of the stripper conveyor, at least one of said transfer conveyors being disposed to receive noodles in an orientation extending transversely to the direction of travel of the conveyor, said one conveyor being curved to convey noodles received thereby through a generally arcuate path and having inner and outer edges driven at different speeds to that the transversely extending orientation of noodles carried thereby is not materially altered as the noodles are conveyed through the arcuate path.

5. In a combination according to claim 4, the improvement wherein said one transfer conveyor comprises a first closed loop plate conveyor defining the inner edge thereof and a second closed loop plate conveyor defining the outer edge thereof, said respective plate conveyors being driven at different speeds so that the angular velocities thereof are substantially equal throughout the curved length of said one conveyor which conveys noodles through the arcuate path.

6. In combination with a stripper for stripping elongate noodles from a high production pasta oven, the improvement comprising: a stripper conveyor disposed in receiving relationship to the stripper to receive noodles from the stripper in side-by-side orientation extending transversely of the conveyor and convey the noodles out of the stripper; a transfer conveyor disposed to receive noodles from the stripper conveyor, said transfer conveyor being orientated to receive noodles in an orientation extending transversely thereof and driven at substantially the same speed as the stripper conveyor; an accumulator conveyor disposed to receive noodles from the transfer conveyor, said accumulator conveyor being orientated to receive noodles in an orientation extending transversely thereof and driven at a speed sufficiently less than that of the transfer conveyor that the space between adjacent noodles is closed-up as noodles are received on the accumulator conveyor; and, an inspection conveyor disposed to receive noodles from the accumulator conveyor, said inspection conveyor being orientated to receive noodles in an orientation extending transversely thereof and driven at a speed equal to or greater than that of the accumulator conveyor.

7. In a combination according to claim 6, the improvement further including a receiving platform disposed at the stripper to collect noodles therefrom and wherein: the stripper conveyor is operatively associated with the platform to receive noodles therefrom and split into a first section disposed to direct noodles received by said section to one side of the stripper and a second section disposed to direct noodles received by said section to a side of the stripper generally opposite said one side; and, the transfer conveyor is disposed in receiving relationship to one of said sections only.

8. In a combination according to claim 6, the improvement further comprising a guide shoe disposed above the accumulator conveyor for floating engagement with the noodles received on the conveyor to assist in preventing overlapping of the noodles.

9. In a combination according to claim 6, the improvement wherein: the stripper and transfer conveyors are driven at a speed of from 60 to 105 feet per minute; the accumulator conveyor is driven at a speed of from 20 to 35 feet per minute; and the inspection conveyor is driven at a speed of from 30 to 50 feet per minute.

10. In a combination according to claim 6, the improvement wherein the inspection conveyor is driven at a speed greater than that of the accumulator conveyor and less than that of the transfer conveyor so that noodles received on the inspection conveyor at least partially spread relative to the condition which they assume on the accumulator conveyor and are conveyed on the inspection conveyor at a speed less than the speed of the transfer conveyor.

11. In a combination according to claim 6, the improvement wherein the ratio of stripper and transfer conveyor speed to accumulator conveyor speed is about 3 to 1 and the ratio of inspection conveyor speed to accumulator conveyor speed is about 1.5 to 1.

12. In a combination according to claim 6, wherein, as stripped from the pasta oven and transported by the inspection conveyors, the noodles are folded upon themselves in a generally U-shaped configuration, the improvement further comprising a pair of saws disposed in receiving relationship to the inspection conveyor to saw the ends off of the noodles to thereby separate each noodle of U-shaped configuration into a pair of noodles and cut the noodles thus formed to a predetermined length.

13. In a combination according to claim 11, the improvement wherein said saws are mounted for selective movement toward and away from one another to vary the length of the noodles.

14. In a combination according to claim 11, the improvment further comprising a center cut saw downstream of the pair of saws to saw the noodles in half.

15. An improved sawing apparatus for handling, in rapid succession, elongate pasta noodle blanks folded upon themselves in a generally U-shaped configuration, said apparatus comprising: a continuous horizontally disposed conveyor adapted to receive the pasta blanks in transversely extending orientation relative thereto and move said blanks through the apparatus in a direction normal to the elongate dimension of the blanks; a closed loop weighting chain disposed above said conveyor, said chain being supported between a pair of sprockets mounted above the conveyor for rotation about axes extending normal to the direction of travel of the conveyor and having a lower reach of sufficient length to permit said reach to sag down relative to the sprockets and engage noodles on the conveyor; means to drive said weighting chain so that so that the lower reach thereof moves at the same speed and in the same direction as the conveyor; a pair of circular end saws mounted above the conveyor for sawing engagement with the ends of noodle blanks supported on the conveyor; means for selectively moving said saws toward and away from each other to vary the length of the noodles cut within the apparatus; a pair of generally vertically disposed guide belts mounted, respectively, to either side of the lead end of the apparatus to direct noodles onto the conveyor, said belts being disposed for engagement with the ends of noodle blanks conveyed to apparatus and converging relative to one another to define a flared mouth longitudinally aligned with the conveyor and having an intake end of a width greater than the length of blanks and a discharge end of a width only slightly greater than the length of the blanks; and, means driving said guide belts so that the inner surfaces of the flared mouth defined thereby move at the same speed as noodle blanks are conveyed to the apparatus.

* * * * *